Jan. 24, 1967     T. J. MURPHY     3,300,137
MANIFOLD HEAT CONTROL VALVE
Filed Aug. 6, 1964
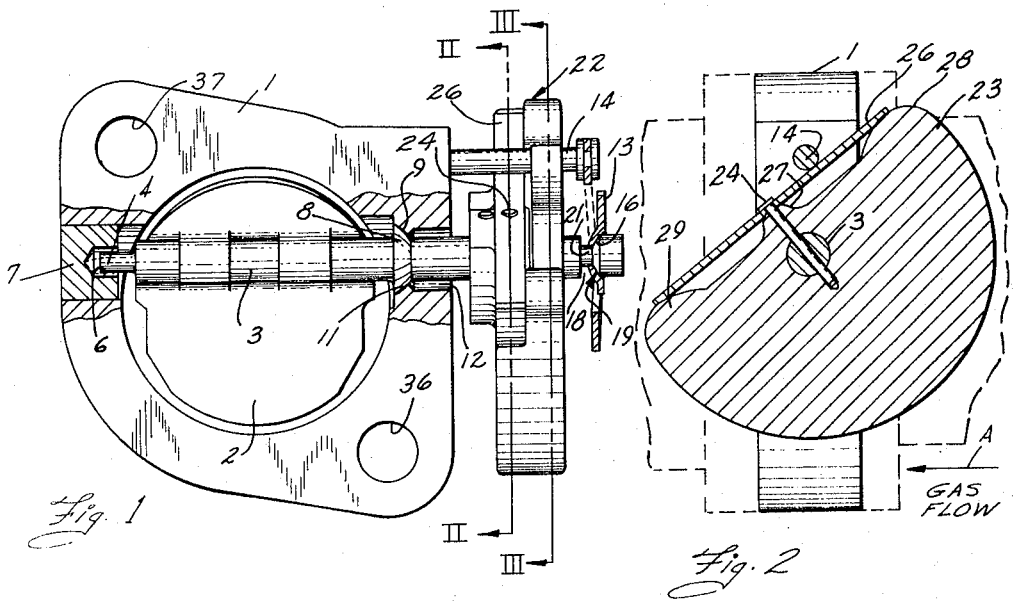
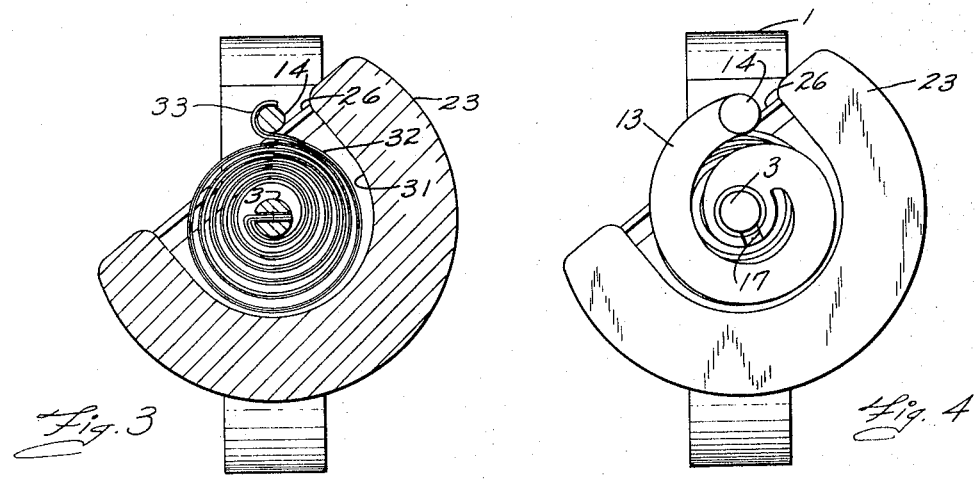
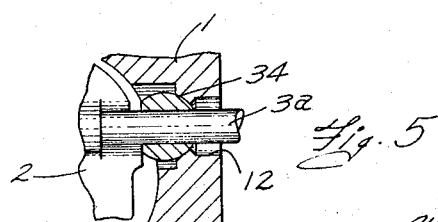
INVENTOR.
TERRANCE JAMES MURPHY
BY
Woodhams, Blanchard and Flynn
ATTORNEYS

United States Patent Office 3,300,137
Patented Jan. 24, 1967

3,300,137
MANIFOLD HEAT CONTROL VALVE
Terrance James Murphy, Detroit, Mich., assignor to Eaton Manufacturing Company, Cleveland, Ohio, a corporation of Ohio
Filed Aug. 6, 1964, Ser. No. 387,914
13 Claims. (Cl. 236—101)

This invention relates to flow control valves and particularly to a type of flow control valve adapted especially for use in the exhaust manifold of an automotive or other type of internal combustion engine.

It has been well known for a long time to place flow control valves in the exhaust manifold of an internal combustion engine, the same being used for a variety of purposes, such as the deflection of a portion of the hot gases to assist the formation of a proper fuel-air mixture by heating a portion of the intake passages. These valves are, however, subjected to very severe operating conditions and the provision of suitable bearings for same has attracted the attention of many previous workers in the field but, insofar as I am aware, without reaching a fully satisfactory solution. It is generally desirable to provide such valves with an operating mechanism which is external to the valve body. The shaft connecting such operating mechanism with the flap of the valve normally extends through a sleeve bearing. One of the problems encountered is that certain acids and other corrosive materials including moisture contained within the exhaust gases tend to condense on the valve structure, and on the bearings provided for same, with the result that the valve bearings may become so corroded that the valve will stick or bind and the desired operation thereof is not obtained. Where a particular automobile is frequently operated in a cold condition, such as for a large number of short trips, this condition is accentuated and the sticking of the valve may occur relatively early in the life of the automobile.

Further, it appears that in addition to the condensates which appear while the engine is running cold, there are also condensates appearing at other times during operation of the engine by reason of exhaust gases escaping along the valve mounting shaft and through the bearings supporting said shaft. This escaping gas is cooled by expansion as it passes through said bearings and condenses out the corrosive materials. Hence, there appears to be a much greater deposit of corrosive materials in the bearing areas than is explained merely by cold operation of the engine. Further, the products of corrosion build up in a radial direction and since there is only a few thousandths of an inch of clearance within said bearings, there is no way in which such build up can be relieved and the bearings soon bind and the valve is rendered inoperative.

In addition, valves utilizing a pair of aligned sleeve bearings to minimize outward flow of the hot gases may bind if the shaft or flap becomes distorted as a result of repeated heating and cooling.

While attempts have been made to prevent, or at least delay such sticking and binding of an exhaust manifold valve by providing greater bearing clearance for the valve mounting, this often results in undesirable flutter of the valve which in turn creates both an improper operation and excessive noise.

Accordingly, the objects of the invention include:

(1) To provide a flow control valve for the exhaust manifold of an internal combustion engine which valve will have a long life through a variety of operating conditions.

(2) To provide means for rotatably mounting a flow control valve in the exhaust manifold of an internal combustion engine which means will resist corrosion by condensates from the exhaust gases flowing through such manifold.

(3) To provide a valve mounting, as aforesaid, which will be less affected than valves previously known by whatever corrosion does occur from such condensates.

(4) To provide a valve mounting, as aforesaid, which will minimize the amount of exhaust gases escaping from the manifold along the shaft on which the control valve is mounted and which will therefore minimize corrosion resulting from condensates deposited on said shaft as a result of the cooling of such gases as they escape from the manifold.

(5) To provide a valve structure, as aforesaid, which has a capacity for a substantial relief movement whereby to enable same to undergo a substantial amount of corrosion without appreciable sticking or binding of the valve in its supporting bearings.

(6) To provide a valve structure, as aforesaid, which can be manufactured at little or no increase in cost over valves previously known.

(7) To provide a valve structure, as aforesaid, which can be replaced as easily as valves previously known if and when such replacement becomes necessary.

(8) To provide a valve, as aforesaid, which will be as fully effective from all operational points of view as valves previously known.

(9) To provide a valve, as aforesaid, which in the assembly of same will require less precise adjustments and/or alignment of its parts than is now required of presently known valves.

(10) To provide a valve, as aforesaid, which can accommodate substantial metal creep occurring during normal operation of the valve without binding or other undesirable effects.

(11) To provide a valve, as aforesaid, having a greater resistance to undesirable flutter and rattling than presently known valves.

Other objects and purposes of the invention will be apparent to persons acquainted with apparatus of this general type upon reading the following disclosure and upon inspection of the accompanying drawings.

In the drawings:

FIGURE 1 is a top view of a flow control valve embodying the invention having parts broken away and shown in cross section.

FIGURE 2 is a sectional view taken along the line II—II of FIGURE 1.

FIGURE 3 is a sectional view taken along the line III—III of FIGURE 1.

FIGURE 4 is an end view of the flow control valve taken from the rightward end of FIGURE 1.

FIGURE 5 is a fragment of FIGURE 1 showing a modification.

*General description*

In meeting the foregoing-named objects and purposes, as well as others incident to the manufacture and use of valves of this type, I have eliminated the journal bearings conventionally provided for valves of this type and have replaced same by means which both provide an effective protection for the bearing surfaces from gases within the exhaust manifold and provides for separation of such bearing surfaces to a substantial extent if necessary to prevent binding as the result of whatever corrosion does occur. More particularly, the valve is supported by a ball-type bearing which simultaneously seals the bearing area to prevent escape of gas from within the manifold, together with an outboard mounted resilient device for axially urging said bearing surfaces together.

*Detailed description*

Referring now in more detail to the accompanying drawings, there is shown in FIGURE 1 an exhaust valve body 1 adapted to fit into a conventional exhaust manifold. A valve plate 2 is provided of any desired kind and shape appropriate to its particular use. The valve plate is mounted in any conventional manner upon a shaft 3. The invention lies in the mounting of this shaft.

One end 4 of said shaft 3 (leftward end as appearing in FIGURE 1) is preferably reduced in diameter and is received loosely into a pilot opening 6, said loose relationship between the end 4 and the opening 6 being both radial and axial. Said opening 6 is here shown as being provided in an insert 7 but it will be recognized, in the light of the further discussion hereinafter, that some expense can be saved without appreciable adverse effect upon operation of the apparatus by eliminating the insert 7 and merely providing the recess 6 in the wall of the valve body 1.

Immediately to the right (as appearing in FIGURE 1) of the valve plate 2, the shaft 3 is provided with an enlarged, here integral, portion 8 which has a spherical surface 9. Said spherical surface 9 fits into a correspondingly shaped seat 11 provided in the wall of an opening 12 through the side of the valve body 1. Said shaft 3 projects through said opening 12 to a point substantially outwardly of the valve body.

Near the outer end of the shaft 3 there is provided resilient means 13 which engages the adjacent end of said shaft 3 for urging same rightwardly whereby to urge the spherical surface 9 against the seat 11 for purposes appearing hereinafter.

Said resilient means 13 may take any of many well-known forms including a helical spring sleeved over the adjacent end of the shaft 3 but in this particular embodiment it consists of a spiral leaf spring best shown in FIGURE 4 which is mounted at its one end upon a post 14 which post is then anchored in any convenient manner rigidly with respect to the valve body 1, such as being mounted directly upon said valve body. The other end of said leaf spring 13 is provided with a spherically surfaced depression 16 and a radial slot 17 (FIGURE 4).

The shaft 3 is provided adjacent its outer end with a groove 18 and the wall defining the outer side of said groove is spherically shaped as indicated at 19. The leaf spring 13 is mounted in place by passing the part carrying the slot 17 over the narrow neck 21 formed by the groove 18 and causing the spherical depression 16 to rest against the spherical surface 19.

Since valve plates 2 of this type are normally gravity biased in one direction and rotated in the opposite direction by a bimetal device, means for effecting such rotation is here shown located between the valve body 1 and the spring 13, such means being indicated generally at 22.

The particular means here shown for this purpose comprises a counterweight 23 eccentrically mounted on the shaft 3 and held against rotation with respect thereto by a pin 24. If desired for resiliently operable rotation limiting purposes, a spring plate 26 may be held by said pin 24 so that it extends across the lobes 27, 28 and 29 of the counterweight 23. The spring 26 in the position shown bears at a point intermediate the lobes 27 and 28 against the post 14 and upon clockwise (as seen in FIGURE 2) rotation of the weight 23, the spring 26 will bear against the post 14 intermediate the lobes 27 and 29.

To accommodate the bimetallic element, a recess 31 is provided within the counterweight 23. The bimetallic element, here the spiral bimetallic device 32, is anchored in any desired manner between the shaft 3 and fixed means, which latter may conveniently be the post 14. In this particular embodiment, such anchoring is accomplished by passing the inner end of the bimetallic spiral 32 through an appropriate slot in the shaft 3 and providing at its outer end a hook 33 for engaging the post 14.

In the particular embodiment of the invention illustrated, the gas flow is as indicated by arrow A in FIGURE 2. The spiral bimetallic device 32 is arranged to normally position the shaft 3 in the position shown in FIGURES 1 and 2 wherein spring plate 26 abuts against pin 14 and the valve is closed. The spiral device 32 will coil upon itself when it is heated and thereby rotate the shaft 3 clockwise and move the valve plate 2 toward the open position.

The counterweight 23 serves to prevent premature closing of the valve when the vehicle changes from a high power condition to a low power condition. Hence, the counterweight 23 is shaped and arranged so that in this particular embodiment it opposes movement of the valve from a partially open position toward a closed position and particularly is arranged so that it exerts a maximum moment opposing return of the valve plate to its closed position when the valve plate is approximately half open. In the closed position as shown in FIGURE 2, the moment exerted by the weight will be small.

It will be apparent that the shape of the counterweight 23 can be varied depending on the position of the valve body 1 when mounted on an engine manifold. Hence, the particular shape of the counterweight 23 shown in FIGURE 2 is given more for the purpose of describing the operating principle of the invention than for the purpose of showing specific design details. In particular, in FIGURE 2 the valve body 1 is shown in a horizontal position and the counterweight is shaped accordingly. In cases where the valve body is mounted with its central axis at an angle with respect to the horizontal, a differently shaped counterweight may be required and can readily be provided. Hence, it is particularly noted that there are many ways in which counterweights for valves of this nature are used and accordingly the exact shape, positioning and function of the counterweight form no part of the invention and may be varied widely.

*Operation*

The valve unit comprising the valve body 1 and the parts associated therewith may be introduced into a manifold in any convenient manner including bolting same to appropriate flanges through the openings 36 and 37, with the rightward side as appearing in FIGURE 2 adjacent to the exhaust manifold. In the cold condition, the spiral bimetallic device 32 holds the valve plate normally in one position, such as the closed position shown in FIGURE 1. As the engine becomes heated, the bimetal element 32 coils upon itself and allows the flow of gas past the valve plate 2 in combination with the counterweight 23 to change the position of the valve plate 2 within the flow passage. The limits of movement in each direction are established by the contact of the spring 26 against the post 14, the same providing a resilient engagement with said post to absorb the shock of sudden closing.

The spring 13 is biased to urge the shaft rightwardly (as appearing in FIGURE 1) whereby to seat the spherical bearing surface 9 snugly against the bearing seat 11. Thus, the two spherical bearings provided by the surfaces 9 and 19 on the shaft are effectively supported and provide support for the valve plate 2. The projecting end 4 is generally unsupported within the recess 6. This insures the effective seating of both of said spherical shaft surfaces and also insures the automatic compensation for changes in dimension due to temperature changes on the valve while maintaining said bearing snugly seated in position. With the spherical surface 19 placed out of contact with the exhaust gases, no corrosion at all can occur with respect to this surface. With the spherical surface 9 being urged snugly against the seat 11, an effective seal is provided between these surfaces so as to permit only a minimum of contact of these surfaces by the exhaust gases and condensates therefrom. Since the end 4 does not normally carry any load and functions only as a guide to limit movement of the shaft 3 if abnormally high forces are applied to it, even if corrosion occurs in this area, the valve will have an extremely long life before such corrosion builds up to an appreciable degree. However, since there is no escape of gas at this point and hence no expansion and consequent cooling of same, the actual deposition of condensate in this area is of no appreciable magnitude. Therefore, with only minimum corrosion, if any, occurring in the area of the recess 6 and this being of no consequence, and with the corrosive gases being fairly well sealed out of contact with the spherical surface 9 and seat 11, very little corrosion takes place on any of the surfaces effecting rotation of the shaft and seizing or binding thereof is prevented for periods of time much longer than customary with present units for the same purpose. Further, if and when some corrosion does occur between the spherical surface 9 and seat 11, it is still possible for the spring 13 to yield and permit the shaft 3 to move leftwardly whereby even such corrosion as does occur will not prevent the shaft from rotating and the valve from operating.

Additionally, the urging of the surface 9 into the seat 11 as a result of the axial thrust thereon by the spring 13 provides a sort of friction damper on the shaft 3 whereby to permit normal movement of the valve to an equilibrium position under the influence of the operating mechanism and aided by normal vibration of the engine, but minimizing the vibration and flutter which often occurs with conventional valves of this general type.

It will be noted that no reliance is placed on the particular types of material employed for minimizing corrosive effects with respect to the parts supporting the shaft 3. Hence, the materials from which the valve is made may be chosen with considerably greater freedom than would be possible if corrosion resistance were a necessary attribute of such materials.

Modifications

A number of modifications will suggest themselves to persons acquainted with apparatus of this general type. Particularly, the arrangement and nature of the spring 13 may be varied widely, including a coil spring as above mentioned and including a plain leaf spring in place of the spiral shape shown in FIGURE 4. In addition, it will in some instances be desirable in place of providing the enlargement 8 on the shaft 3 as shown in FIGURE 1 to utilize a ball, or partial ball 34, of a different material as shown in FIGURE 5, the same being passed over the shaft 3a appearing therein and fastened thereto by any convenient means such as shrinking, swaging or brazing.

It will be apparent that the valve can be applied in a variety of ways to various types of engines, including V-8 engines and 6-cylinder in-line engines.

Although particular preferred embodiments of the invention have been described above in detail, variations or modifications thereof which come within the scope of the appended claims are fully contemplated.

What is claimed is:
1. A fluid flow control valve comprising in combination:
   a valve body having a fluid flow opening therethrough;
   a shaft opening extending through a wall of said valve body and having an inwardly facing seat provided therein;
   a shaft extending through said opening and carrying fixed with respect thereto a bearing element having a bearing surface axially opposed to said seat;
   resilient means anchored fixedly with respect to said valve body located outside of said seat and bearing longitudinally onto said shaft for urging said bearing surface and said seat together;
   a valve closure fixed to said shaft and means on said shaft for opening and closing said valve.
2. A fluid flow control valve comprising in combination:
   a valve body having a fluid flow opening therethrough;
   a shaft opening extending through a wall of said valve body and having an inwardly flaring seat provided therein;
   a shaft extending through said opening and carrying fixed with respect thereto a bearing element having a tapered bearing capable of fitting against said flaring seat;
   resilient means anchored fixedly with respect to said valve body located outside of said seat and bearing longitudinally onto said shaft for urging said bearing surface and said seat together, the zone where said bearing engages said seat providing the sole support for said shaft so that said shaft can assume varying angular positions in said valve body;
   a valve closure fixed to said shaft and operating means on said shaft for opening and closing said valve.
3. The valve defined in claim 1 including also a recess aligned coaxially with said shaft opening and in a wall of said valve body opposite to said first-named wall; and a projection extending coaxially from said shaft into said recess but substantially spaced both radially and axially from the walls defining said recess.
4. The valve defined in claim 1 wherein said shaft is of unitary construction, said bearing surface and said seat are portions of a sphere and said resilient means is located outside of said valve body.
5. The valve defined in claim 1 including a post extending from said valve body in the direction parallel with said shaft for anchoring said resilient means to said valve body, said resilient means extending substantially radially from said post and engaging said shaft to permit rotation of said shaft with respect to said resilient means while applying axial thrust to said shaft.
6. The valve defined in claim 1 including also a post extending from said valve body in the direction parallel to but spaced from said shaft and said resilient means being a generally spirally shaped spring anchored at one end to said post and having its other end related to said shaft in such a manner as to permit relative rotation between said shaft and said spring while applying axial thrust by said spring onto said shaft.
7. The valve defined in claim 1 including a post extending from said valve body in the direction parallel to but spaced from said shaft and wherein said resilient means comprises a spring affixed at one end substantially rigidly to said post and having a concavity in its other end defining a portion of a sphere, said shaft having a groove therein at a point spaced from said valve body, the wall of said groove remote from the valve body defining a portion of a sphere, the concavity of said spring bearing against said wall for permitting relative rotation between said shaft and said spring while enabling said spring to apply a constant longitudinal thrust onto said shaft.
8. The valve defined in claim 1 including a post extending from said valve body parallel with and spaced from said shaft and a valve operator mounted on said shaft provided with gravity responsive means for rotating said shaft in one direction and heat responsive means for rotating said shaft in the opposite direction, said gravity responsive means including means for supporting a leaf spring substantially perpendicular to a radius of said shaft, said spring being supported at its midpoint and at its outer ends, said parts being so related to said post that said post will contact said spring between its points of support and thereby constitute a resilient limit for rotation of said shaft in either direction.
9. The valve defined in claim 1 wherein said bearing surface is an integral part of said shaft.
10. The valve defined in claim 1 wherein said bearing surface is a portion of a separate element sleeved unto and rigidly affixed to said shaft.
11. In a valve, particularly for an exhaust manifold, the combination comprising:
   a valve body having a fluid flow opening therethrough, said valve body having shaft openings on opposite sides of said fluid flow opening, one of said shaft openings having an inwardly facing partially spherical seat therein;
   a valve element disposed within said fluid flow opening for controlling the flow of fluid through said fluid flow opening;

shaft means supporting said valve element for movement within said fluid flow opening, said shaft means having a first end portion extending through said one shaft opening and projecting outwardly from said valve body, said first end portion having thereon an outwardly facing partially spherical surface, said surface facing and being adapted for sealing engagement with said seat in varying angular positions of said shaft means with respect to said seat;

said shaft means having a second end portion received in the other of said shaft openings, said second end portion being of smaller size than said other shaft opening and being spaced from the walls of said other shaft opening so that said second end portion is free to move radially and axially in said other shaft opening whereby said shaft means can assume varying angular positions within said valve body; and resilient means engaging the first end portion of said shaft means at a position outside of said seat for continuously urging said shaft means axially outwardly so that said surface sealingly engages said seat in all angular positions of said shaft means within said valve body.

12. A valve according to claim 11, in which said end portions of said shaft means are radially spaced from and are free from support by the walls of said shaft openings, and said seat and surface provide the sole support for said shaft means within said valve body so that said shaft means can pivot about the common axis of said seat and said surface.

13. A valve as defined in claim 2, in which said bearing surface and said seat are portions of a sphere, said valve closure being mounted on said shaft on one axial side of said bearing surface, said resilient means and said operating means being connected to said shaft on the opposite axial side of said bearing surface.

References Cited by the Examiner
UNITED STATES PATENTS

| | | | |
|---|---|---|---|
| 807,981 | 12/1905 | Whitaker | 277—33 |
| 837,063 | 11/1906 | Hite et al. | 277—33 X |
| 2,504,863 | 4/1950 | Monroe et al. | 277—33 |
| 2,766,768 | 10/1956 | Brown et al. | 236—101 X |
| 2,819,025 | 1/1958 | Else et al. | 236—101 |
| 2,857,926 | 10/1958 | Rundquist. | |

ALDEN D. STEWART, *Primary Examiner.*